United States Patent [19]

Bischoff

[11] Patent Number: 4,542,933
[45] Date of Patent: Sep. 24, 1985

[54] CAMPER SUPERSTRUCTURE

[76] Inventor: Rainer Bischoff, Industriestrasse 12, 5403 Muelheim-Kaerlich, Fed. Rep. of Germany

[21] Appl. No.: 345,693

[22] Filed: Feb. 4, 1982

[30] Foreign Application Priority Data

Feb. 6, 1981 [DE] Fed. Rep. of Germany ... 8103178[U]
Apr. 16, 1981 [DE] Fed. Rep. of Germany .... 3115452.2
Dec. 12, 1981 [DE] Fed. Rep. of Germany ....... 3149368

[51] Int. Cl.$^4$ ............ B60P 3/32; B60P 1/64; B62D 29/04
[52] U.S. Cl. .................... 296/164; 296/197; 296/29; 296/31 P; 296/39 A; 52/282; 52/631
[58] Field of Search ........ 296/156, 164, 168, 181–183, 296/187, 203, 29, 30, 31 R, 31 P, 39 A, 196, 197; 52/281, 282, 309.5, 631, 309.4, 309.8, 127.7, 127.12, 480, 483, 506, 787; 428/71, 76, 319.1

[56] References Cited

U.S. PATENT DOCUMENTS

| | | | |
|---|---|---|---|
| 1,723,307 | 8/1929 | Sipe | 296/29 |
| 2,388,297 | 11/1945 | Slaughter | 296/29 |
| 3,003,810 | 10/1961 | Kloote et al. | 296/181 |
| 3,151,573 | 10/1964 | Eggert, Jr. | 296/29 |
| 3,394,526 | 7/1968 | Engelbrecht | 52/282 |
| 3,436,881 | 4/1969 | Schlecht | 52/282 |
| 3,496,689 | 2/1970 | Nerem | 296/164 |
| 3,586,363 | 6/1971 | Omlid | 296/1 R |
| 3,764,048 | 10/1973 | Gore | 296/37.14 |
| 4,082,882 | 4/1978 | Weinstein et al. | 296/31 P |
| 4,292,369 | 9/1981 | Ohashi et al. | 428/319.1 |
| 4,314,726 | 2/1982 | Artweger | 296/164 |
| 4,351,558 | 9/1982 | Mueller | 296/31 P |
| 4,352,843 | 10/1982 | Eckert | 52/631 |
| 4,359,496 | 11/1982 | Kratel et al. | 428/76 |
| 4,374,693 | 2/1983 | Pitt | 428/71 |

FOREIGN PATENT DOCUMENTS

| | | | |
|---|---|---|---|
| 834014 | 2/1970 | Canada | 296/164 |
| 1388472 | 3/1975 | United Kingdom | 296/164 |

*Primary Examiner*—Robert B. Reeves
*Assistant Examiner*—Dennis H. Pedder
*Attorney, Agent, or Firm*—Karl F. Ross; Herbert Dubno

[57] ABSTRACT

A camper unit, adapted to be mounted on a vehicle, has a boxlike structure whose front, top and rear walls are formed in one piece of said foam plate sandwiched between aluminum layers with the angular junctions between these walls formed by mitering the hard foam and bending the outer aluminum layer so that edges of the hard foam plate are adhesively bonded together. The lateral walls are connected to the front, top and rear walls by connecting strips which are mitered at their ends to join one another all around the lateral walls and are welded to mitered junctions. A T-section member is affixed to the walls of the boxlike structure in a horizontal plane and circumferentially thereof to support the floor which is likewise formed as a hard foam plate sandwiched between layers.

10 Claims, 20 Drawing Figures

Fig.13 (III-III)

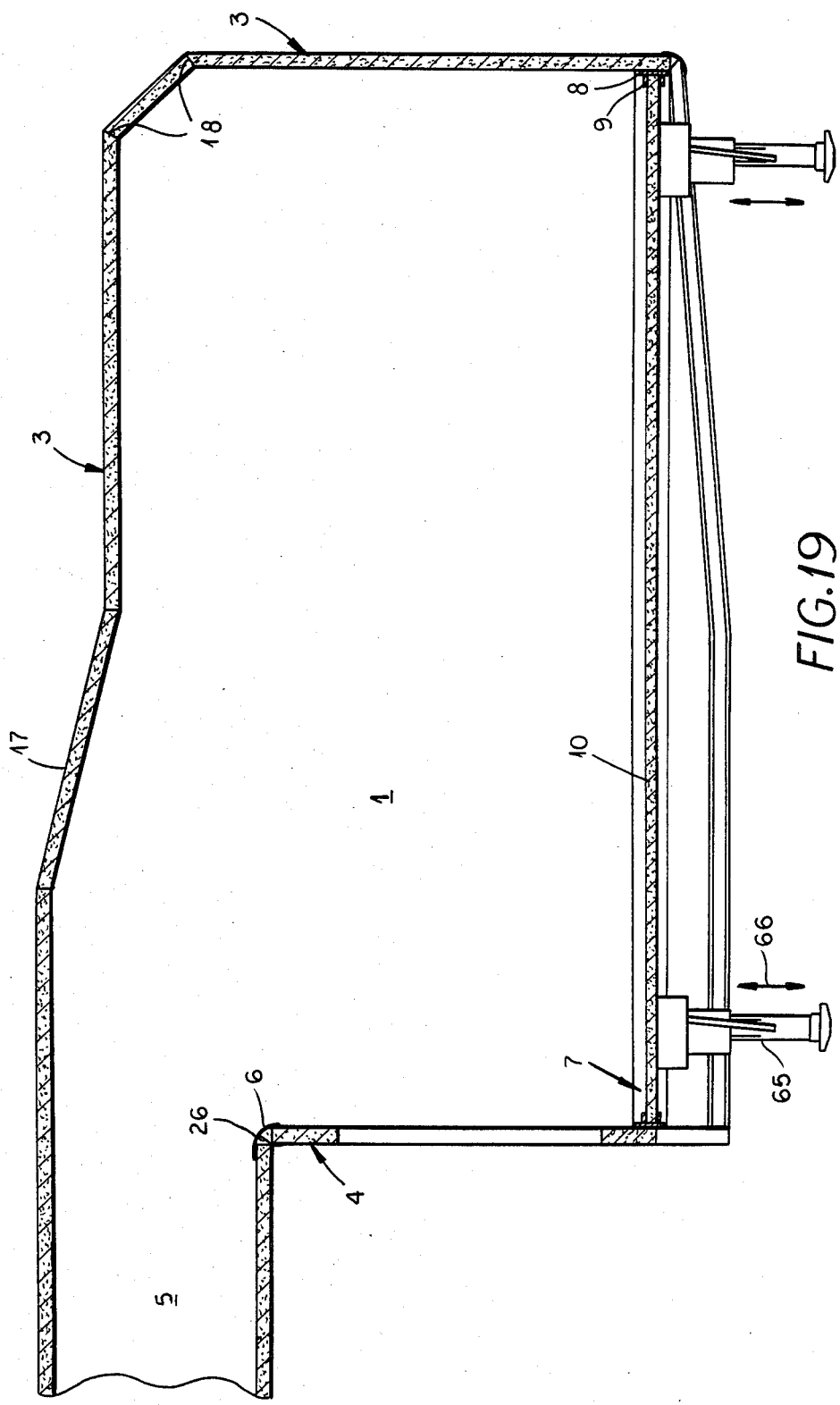

CAMPER SUPERSTRUCTURE

FIELD OF THE INVENTION

The invention relates to a camper superstructure in the form of a closed, self-supporting box mounted as a unit on the chassis of a motor-vehicle.

BACKGROUND OF THE INVENTION

A camper superstructure of the above-mentioned type is already known. It is manufactured to fit the chassis of the motor vehicle as a finished unit which is mounted on the chassis frame and joined with the latter by bolts or the like. But it can also be mounted in a short time, so that the vehicle can be used for other purposes e.g. upon removal of the camper unit.

Such camper superstructures consist of prefabricated steel frames, joined with each other by welding or by screws, which are covered with plywood and on the outside with aluminum plates. The cavities between the steel girders are filled with heat-insulating material. The structures are flanged with each other to make them waterproof. The flanged areas are covered with cover strips.

These constructions are highly stable, but require a large amount of material, considerable assembly work and high cost. Besides, they are heavy, which causes a high energy comsumption for the vehicle carrying the superstructure. A disadvantage is also that the heat insulation is incomplete, since the steel girders of the frame parts are thermally conductive and form low-temperature bridges.

It has therefore been tried to make such superstructures of coated plastic hard foam plates (polyurethane-hard foam) without a frame, so that the weight is considerably reduced, and the assembly simplified. But in this "sandwich" construction, the connection of the outer walls with the roof is highly problematic, due to the low load capacity of the plastic material. In order to provide a base for the application of screws, wood strips are therefore inserted into the edges of the hard foam plates, which permit a firm connection of roof and outer walls by means of screws. But these screw areas must be covered with plate webs for sealing. The necessary flanges on the outer walls and on the edges of the superstructure are covered by means of correspondingly shaped strips.

This design too is time-consuming and costly, and the seals must be made very carefully, otherwise leaks occur.

OBJECT OF THE INVENTION

The primary object of the invention is to provide a camper superstructure of the above-mentioned type, where the walls and roof are made exclusively of coated plastic hard foam material and are nevertheless permanently joined with each other in a simple and inexpensive manner so that a stable unit is obtained, while ensuring at the same time optimum heat insulation and reliable sealing.

SUMMARY OF THE INVENTION

This object is achieved according to the invention with a camper superstructure which consists of one-piece plastic hard foam plates, preferably of polyurethane coated on both sides with aluminum (sandwich plates), whose right-angled ends are inserted into sectional aluminum strips and joined in a unit by a special cement, preferably a two-component cement, based on polyurethane. The structure has a bottom plate which is secured by means of a circumferential aluminum T-section to the walls formed of aluminum-coated plastic hard foam plates.

A compact box is, thus obtained in a simple and fast manner which is weather- and rainproof, has good heat insulating properties, and is also light-weight.

It can be rapidly mounted on the chassis of the motor vehicle and can serve as a mobile home. Depending on its interior design, it can also serve as an office, shipping room for tools, apparatus or machines.

It is possible to dismount the unit from the vehicle, so that the latter can be used standard commercial vehicle. Of particular advantage is the fact that, when the vehicle wears out or becomes defective, the camper unit can be rapidly mounted again on any other vehicle.

By using a solvent-free polyurethane-based two-component cement, the aluminum-coated polyurethane hard foam plates and the sectional aluminum strips can be permanently joined with each other. The cement does not attack the plastic hard foam, but is rather equally suitable for cementing plastic hard foam and metals. The cement is a sliding cement which hardens only after several hours. This facilitates the assembly of the parts. After hardening, the parts can only be separated again by free-cutting machining.

The mounting and dismounting of the superstructure can be facilitated according to one embodiment of the invention wherein hydraulically or mechanically extensible supports are arranged under the bottom plate.

A high degree of tightness and great strength can be achieved by fabricating the roof, rear wall, and alcove as a single unitary piece. Besides, it makes strips, which normally serve as a corner connection superfluous.

Complete heat insulation, even in the region of the ends of the superstructure according to the invention, is achieved by the use of bores which are distributed over the walls of the sectional aluminum strips arranged inside the superstructure according to the invention, through which the plastic foam components are introduced into the cavities. The bores serve here at the same time as expansion spaces for the plastic material foamed in place.

The special round outside form of the extruded sectional aluminum strips used as connectors has the advantage that all sides of the superstructure according to the invention are smooth and rounded, so that there is no risk of injuries. The ends of the sections protruding in pairs form pockets in which the aluminum-coated plastic hard foam plates are held after insertion. The stop bars provide a clearly defined end position for the plates. The serrated slats prevent the plates from being displaced again after insertion.

Hardwood inserts are used in one embodiment to permit the permanent and reliable fastening of the bottom plate, and thus of the entire unit on the chassis frame by means of screws, preferably common carriage bolts. Twelve screws, which are guided by the hard wood inserts in the bottom plate, suffice for fastening on the frame. The undersurface of the bottom plate is covered with aluminum for protection against moisture. The polyurethane foam introduced into the cavities of the bottom plate effects a good insulation of the superstructure according to the invention, even at the bottom.

Due to the advantageous arrangement of storage boxes in front of and behind the wheel wells, additional space is provided inside the superstructure according to the invention. Heretofore, it was customary to arrange these boxes on the inside, so that much space was lost.

According to another embodiment, the interiors of the boxes contain tanks. The design of the boxes of aluminum-coated hard foam plastic plates imparts to them great strength, so that they are particularly suitable to receive tanks. Beyond that, this coating ensures good insulation against frost.

The plates have a very high insulation value, great stability and good weather resistance.

Due to the design of the superstructure, ring anchors enclosing the side walls and forming the sectional aluminum strips are additionally stabilized in transverse direction and ensure stiffening of the entire superstructure.

In another embodiment, a one-piece bottom plate is used, consisting of a plastic hard foam coated on both sides. This substantially simplifies the manufacture of the bottom of the superstructure. In addition low-temperature bridges are avoided. Besides, particularly great stability is imparted to the bottom. By the coating of the bottom plate on its underside with glass fiber-reinforced plastic, it is made insensitive to weather influences.

The sensitive cut surfaces of the sandwich plates are protected against weather influences and impact and shock in still another embodiment. Beyond that, these measures increase the vapor-tightness of the construction. Last but not least, the fastening of these special foils is effortless and simple.

By using labor-saving drilling jigs, the boxes can be equipped in the workshop on the bottom plate with the U-section pieces, independent of the respective vehicle chassis and then be kept in stock, prefabricated and finished on the inside. The finished box, including the interior decor, can then be attached on the chassis of the respective vehicle. The U-section pieces permit moving the entire superstructure along the chassis girders until the desired nominal position is reached; the final fixing is effected by welding.

BRIEF DESCRIPTION OF THE DRAWINGS

The objects and advantages will in part be described, and in part become apparent when consideration is given to the following detailed description with reference to the appended drawings in which:

FIG. 19 is a longitudinal section similar to FIG. 4 through the camper superstructure, but showing the extensible supports beneath the floor for supporting the box of this structure on the ground.

DETAILED DESCRIPTION OF THE INVENTION

Figure 1:
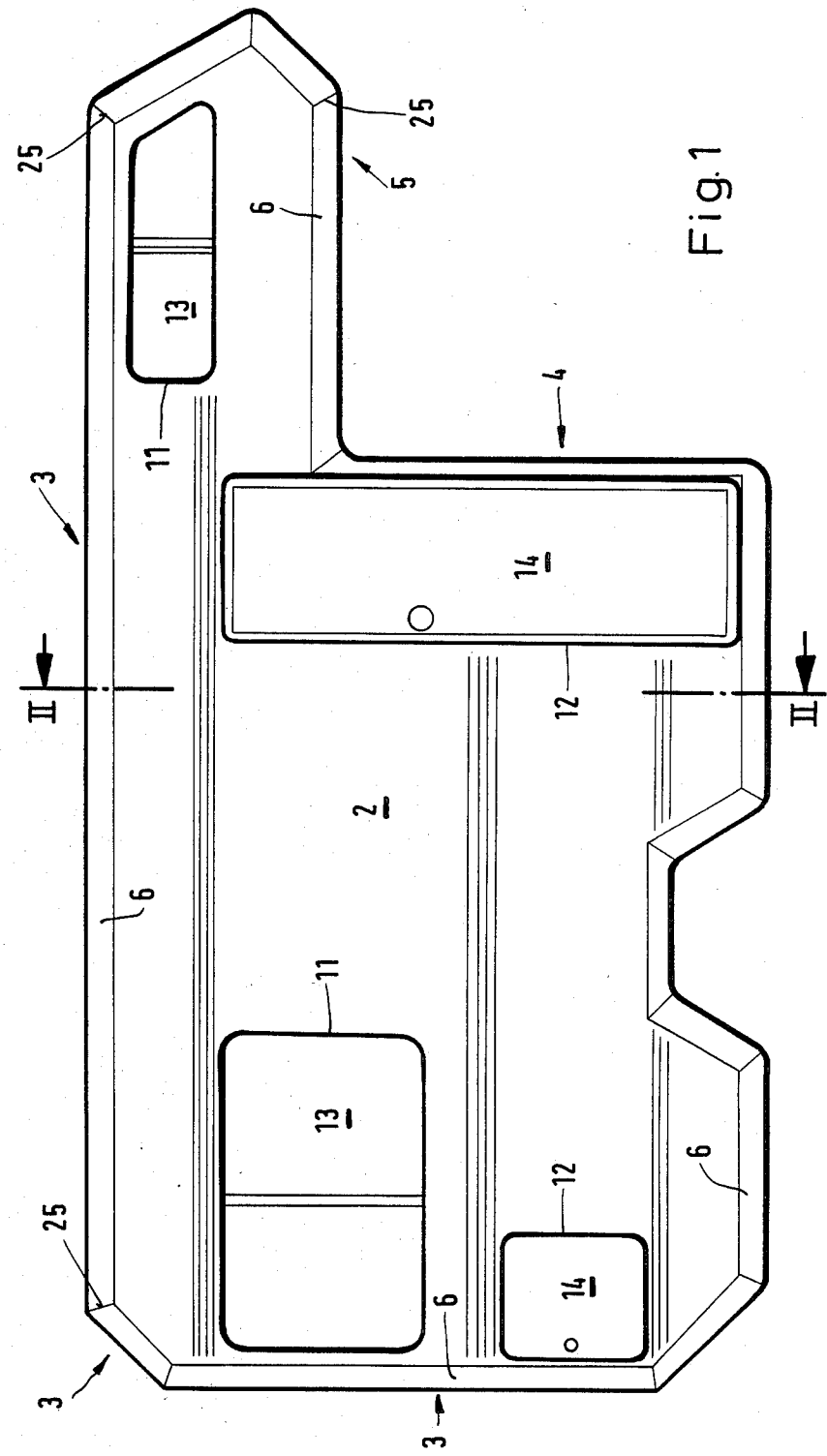
FIG. 1 is a side elevation of the camper superstructure with an alcove according to the invention.
Figure 2:
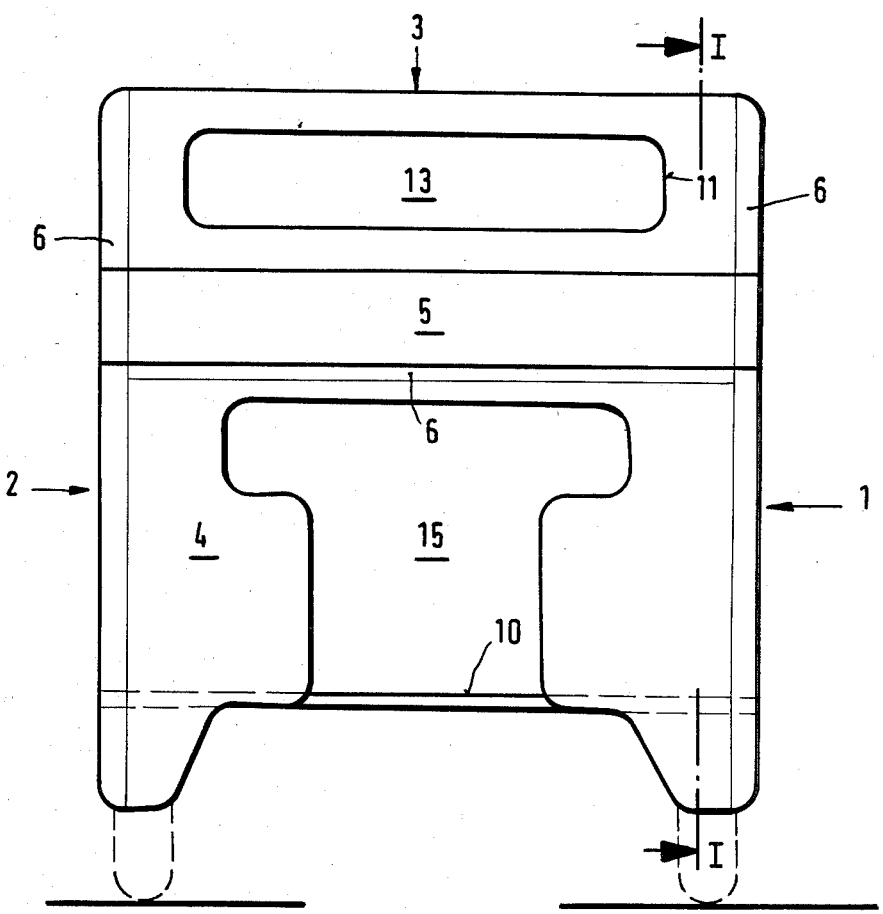
FIG. 2 is a front view of the superstructure according to the invention.
Figure 3:
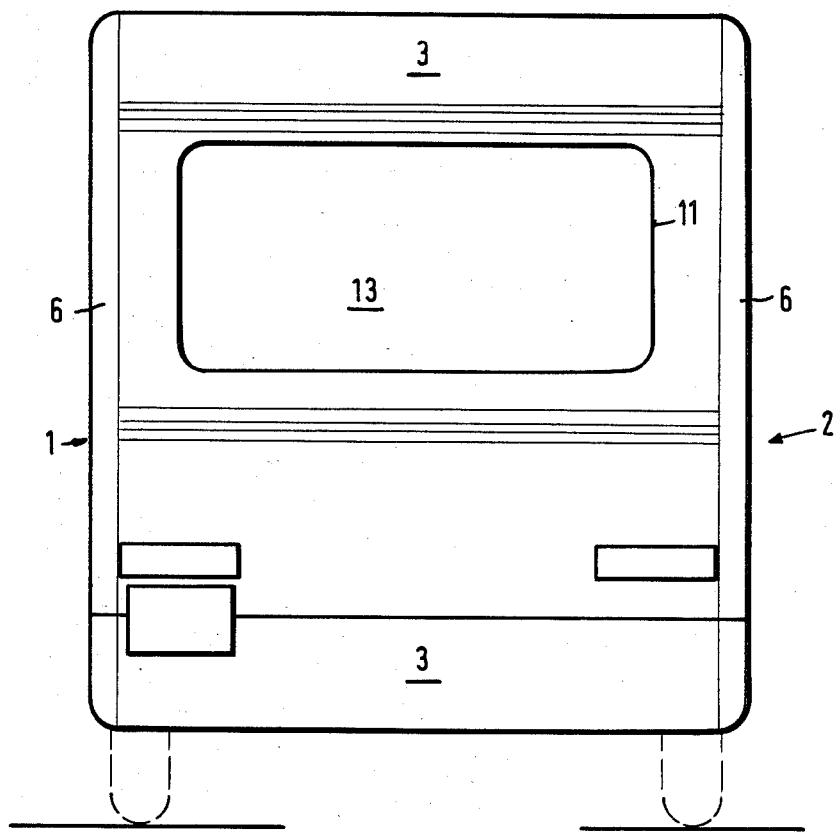
FIG. 3 is a rear view of the superstructure according to the invention.

The embodiment of the camper superstructure described and illustrated in the drawings consists of polyurethane-hard foam plates of 5 cm thickness, which are coated on both sides with chromatized aluminum of about 1 cm in thickness. These are plates 1 and 2 for the two side walls, plate 3 for the roof with integral rear wall and alcove 5, as well as plate 4 for the front wall part underneath the alcove.

Figure 4:
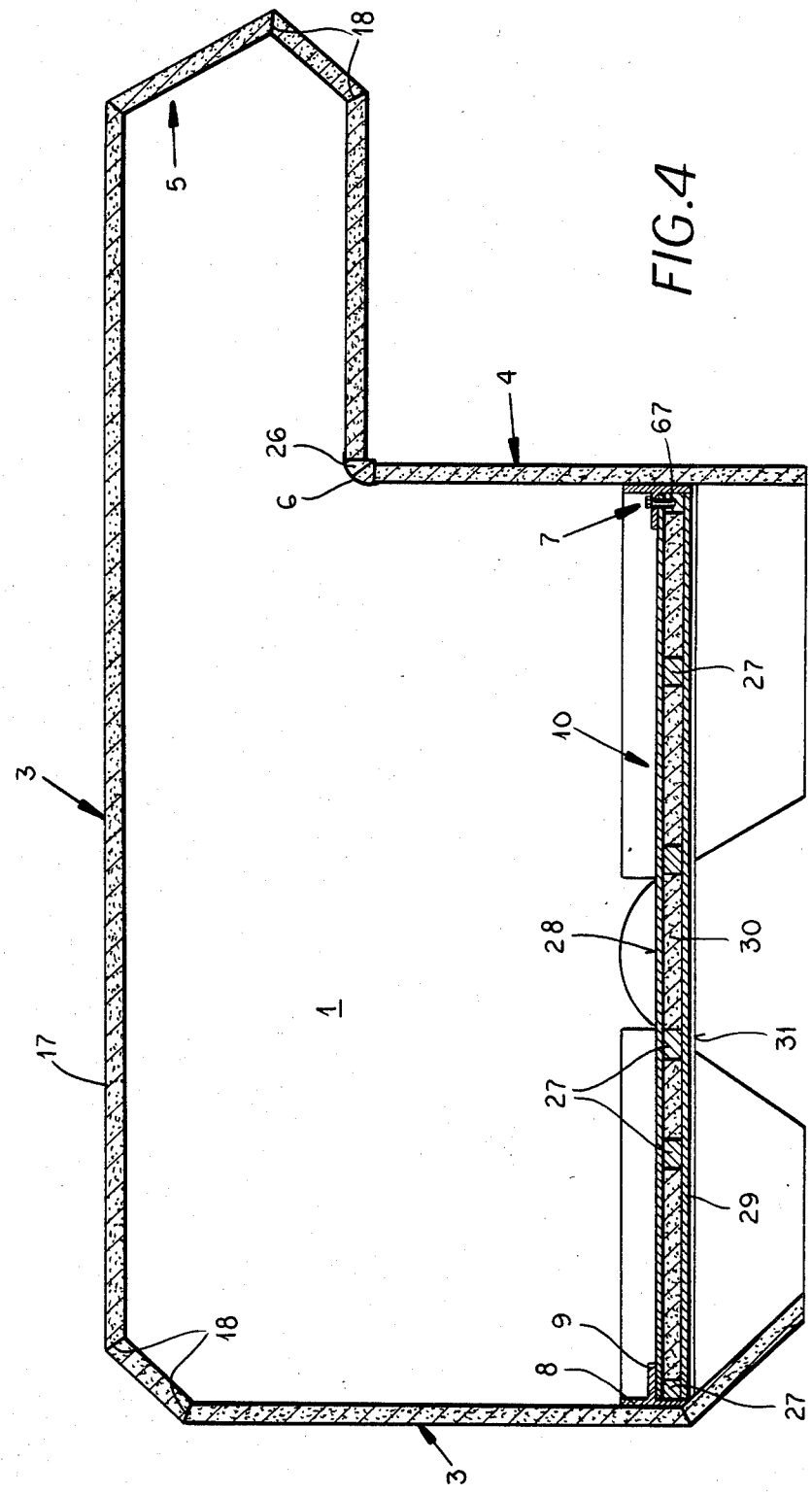
FIG. 4 is a longitudinal section taken along line I—I of FIG. 2 through the superstructure with its floor.

The right-angled ends of plates 1, 2, 3 and 4 are inserted into extruded sectional aluminum strips 6 and joined together as a unit by a suitable cement. On the inner walls of plates 1, 2, 3 and 4 is secured a circumferential aluminum T-section 7 (FIG. 4) by means of a suitable cement and rivets (not shown), in such a way that flange 8 bears on the plate walls, while web part 9 is arranged horizontally and serves as a support for bottom plate 10. The latter is secured on web part 9 by means of screws 67 (FIG. 4).

The use of T-section 7 ensures a particularly shear-resistant joint, so that bottom plate 10 can not break off even under great stress, e.g. by pot holes.

Window- and door-openings 11 and 12, in which heat insulating compound-glass windows 13 or heat-insulating doors can be installed, can be cut out at suitable points in plates 1, 2, 3 and 4.

A large recess 15 for joining the superstructure according to the invention with the driver's cabin can be provided in front wall 4, underneath alcove 5. Hydraulically or mechanically extensible supports to facilitate the mounting and dismounting of the superstructure can be arranged under bottom plate 10.

Figure 6:
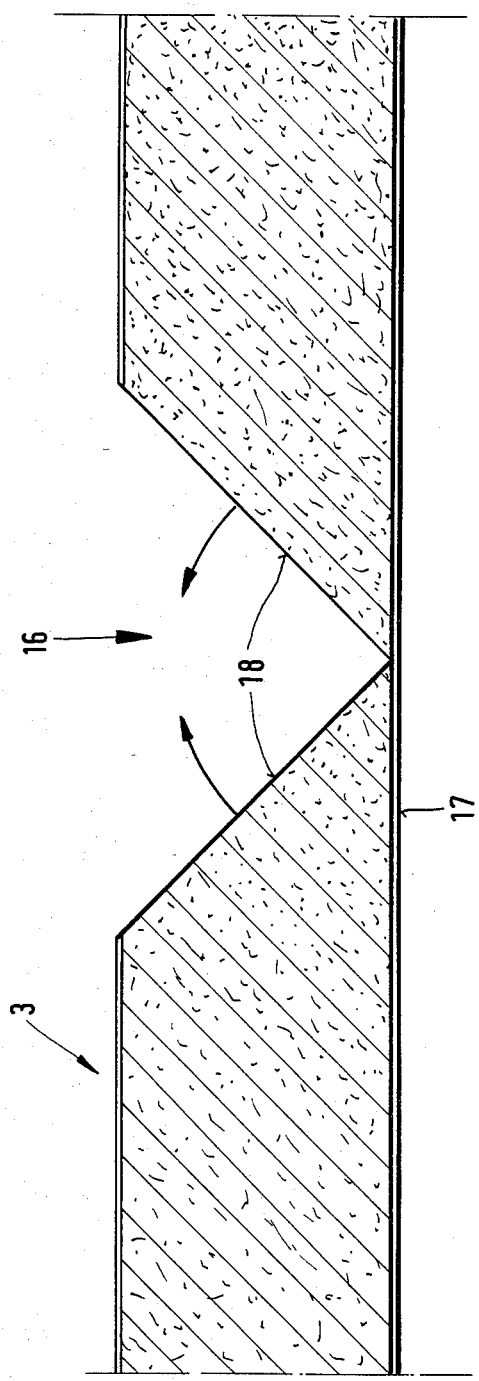
FIG. 6 is a partial section (on a larger scale) through the plastic hard foam plate for forming the part for the rear wall, roof and alcove before it is bent into its final shape.
Figure 20:
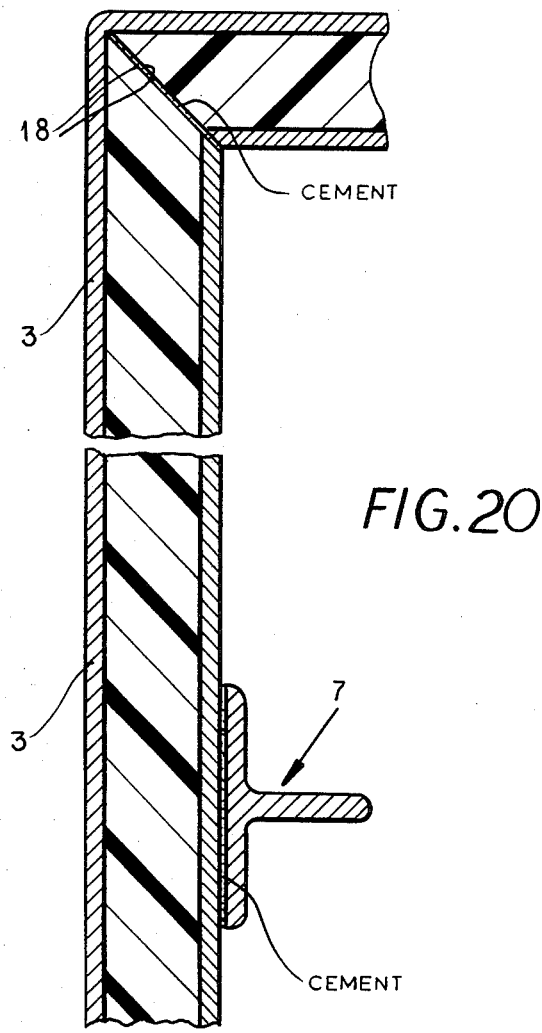
FIG. 20 is a detail cross-sectional view showing how the mitered sections of the unitary structure are joined by cement.

As can be seen in FIG. 6, part 3 forming the alcove, roof and the rear wall is made seamless by providing transverse V-shaped cutouts 16 on the inner surface of the aluminum-coated polyurethane-hard foam plate at the points where directional changes must be made in the plate, while aluminum skin 17 remains intact, in such a way that plate 3 can be bent in the range of cutouts 16 about skin 17 at an angle of about 45 degrees until the adjacent miter surfaces 18 of plate 3 bear on each other and the part has assumed the desired shape as shown in FIG. 4. Miter surfaces 18 are permanently joined with each other by means of a two-component polyurethane cement (see FIG. 20).

Figure 7:
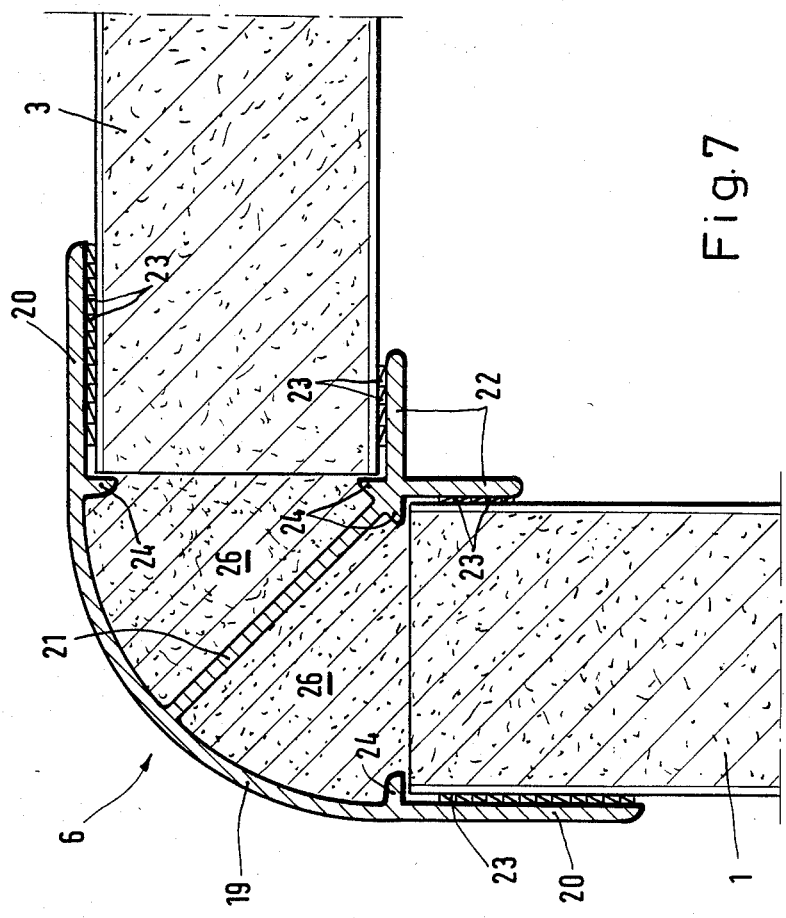
FIG. 7 is a section on an enlarged scale of the corner connection of the plastic hard foam plates for the roof and side walls by means of sectional aluminum strips according to the invention.
Figure 8:
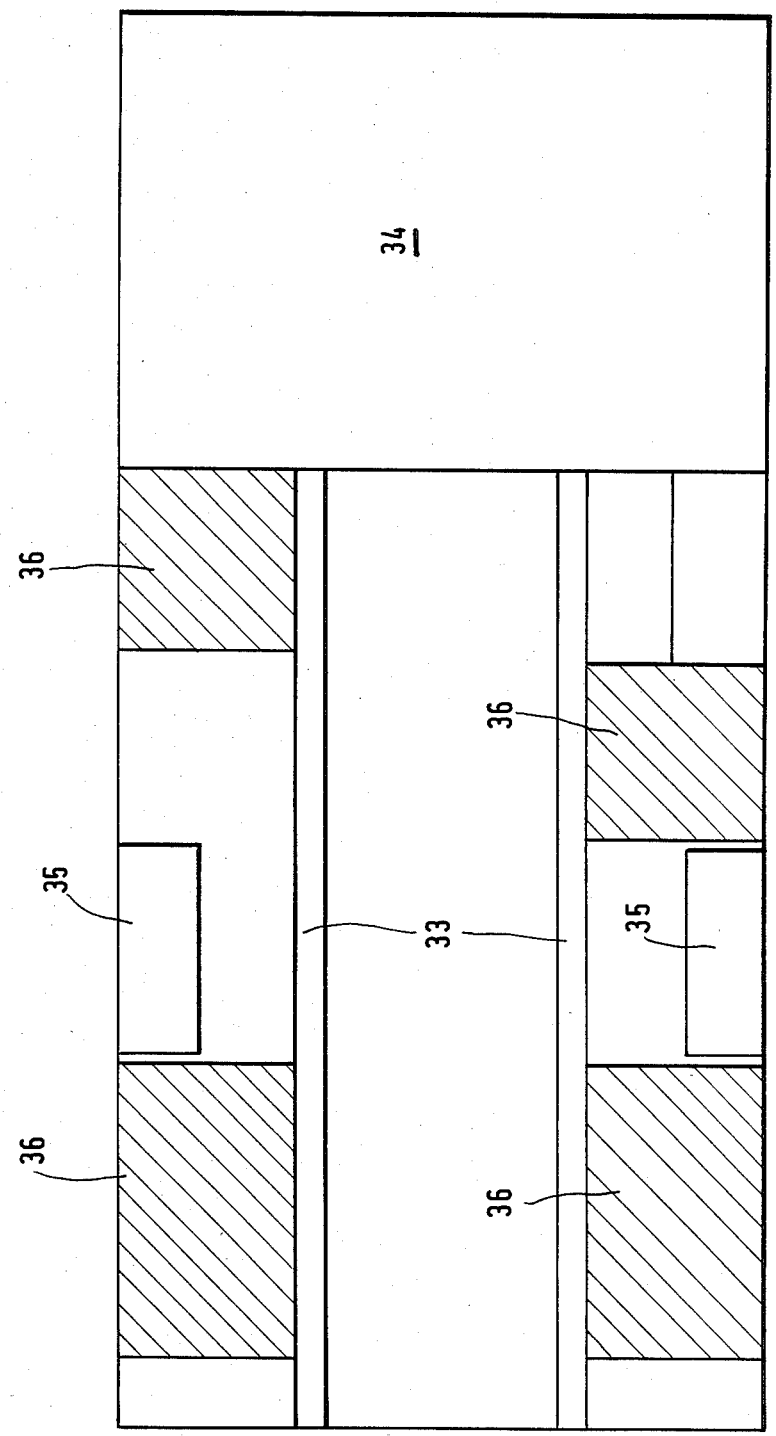
FIG. 8 is a schematic plan view of the superstructure according to the invention, as well as of the vehicle with the storage boxes.
Figure 9:
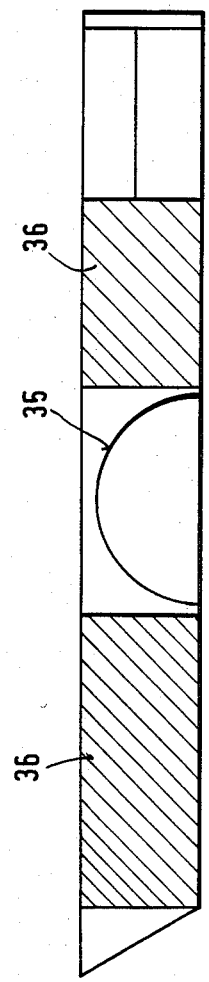
FIG. 9 is a partial longitudinal section through the bottom part of the superstructure according to the invention with the storage boxes and the wheel wells.
Figure 10:
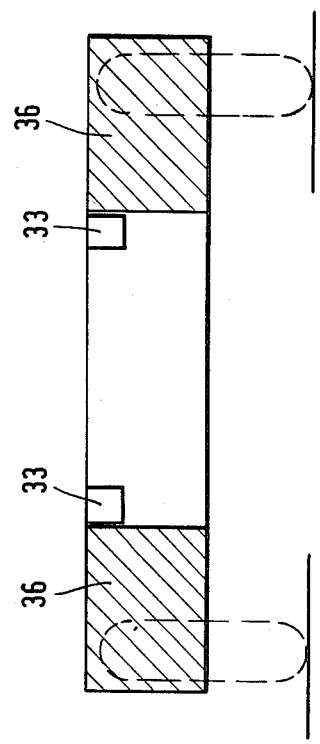
FIG. 10 is a partial cross section through the bottom part of the superstructure according to the invention in the range of the storage boxes with frame supports.

Referring to FIG. 7, sectional aluminum strips 6, which serve to join plates 1, 2, 3 and 4 abutting in a right angle with each other, have a quadrant-shaped rounding 19, seen in the cross-section, which terminates in straight ends 20. In the radial direction, a profiled strap 21 is molded on the inside on the quadrant-shaped rounding 19, at an angle of about 45 degrees to both plates bisecting the the right-angle-section strip free ends of which are molded ends 22 extending in a right angle to each other parallel to the respective opposite ends 20 in such a way that receiving pockets for plates 1, 2, 3 and 4, are formed. The inner walls of ends 20 and 22 each carry serrated slats 23, which are barb-shaped in the cross section, which extend in the longitudinal direction of the profile parallel to each other, and which retain plates 1, 2, 3 and 4 after insertion. Stop bars 24 serve as a stop for plates 1, 2, 3 and 4 on the inner walls of the section which oppose each other.

Sectional aluminum strips 6 are mitered at the ends. They bear on each other at the corners with their miter edges 25 (FIG. 1) and are permanently joined with each other by welding.

Cavities 26 in sectional aluminum bars 6 are filled with plastic foam for the right-angled connection of plates 1, 2, 3 and 4 after the assembly.

Figure 5:
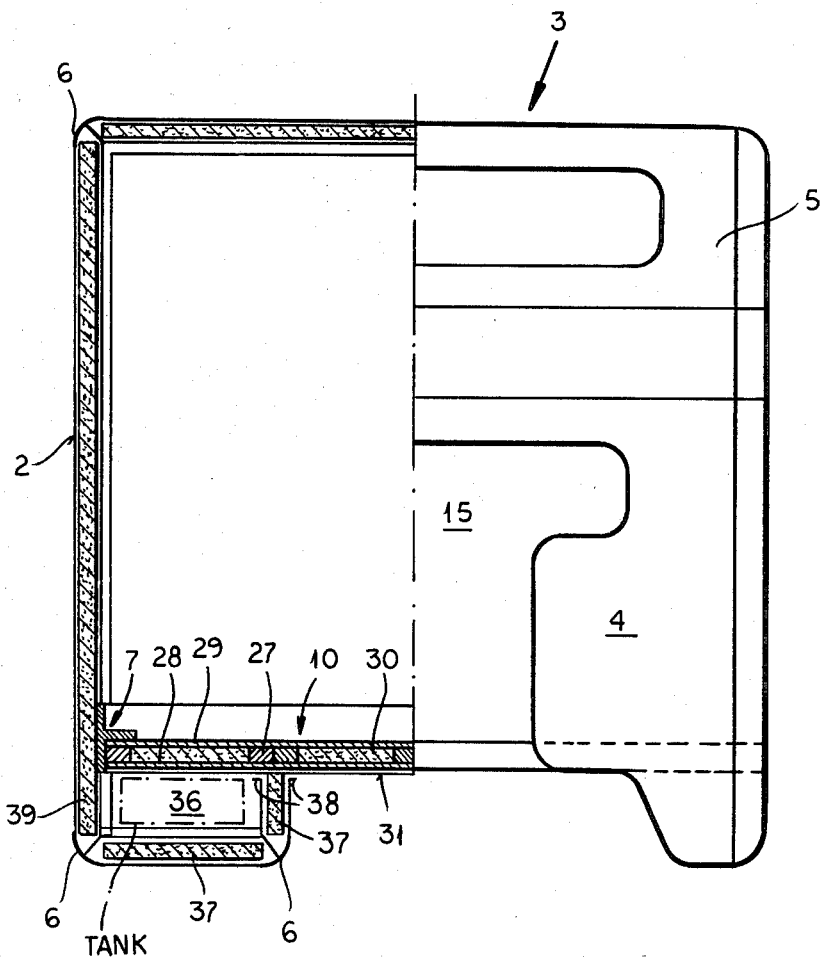
FIG. 5 is a partial cross section through the superstructure taken along line II—II of FIG. 1 according to the invention with the built-in storage boxes under the bottom plate.
Figure 11:
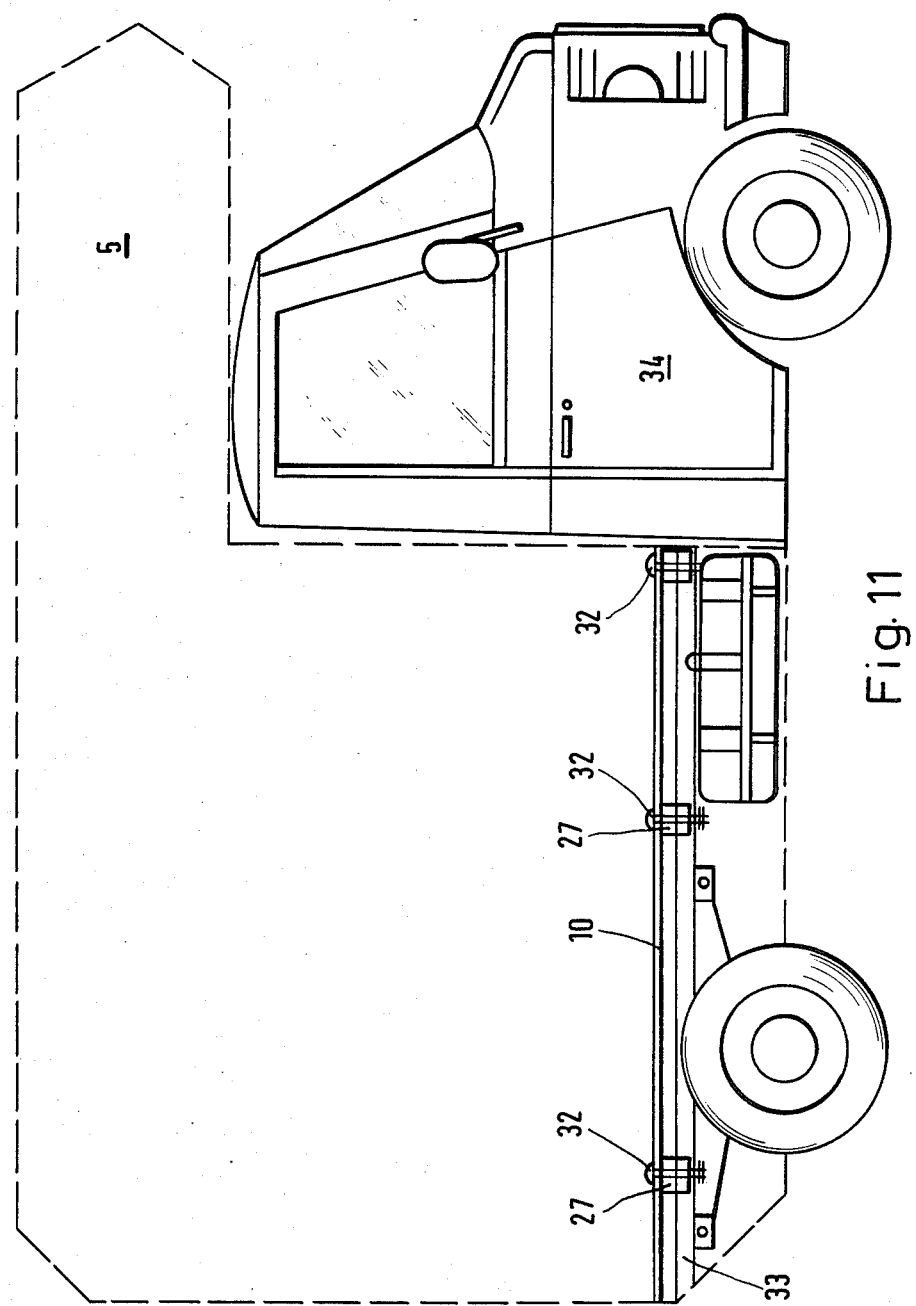
FIG. 11 is a view of the superstructure mounted on the vehicle with a partial longitudinal section through the bottom plate and the screw unions.

Attention is now directed to FIGS. 4 and 5 where it will be seen that bottom plate 10 consists of a hard wood frame 27 with intermediate panels of the same material and is covered with waterproof-glued plywood plates 28 and 29. Cavities 30 are filled with insulating polyurethane foam. The undersurface is covered with a continuous aluminum plate 31. Bottom plate 10 is secured on chassis frame members 33 of vehicle 34 by means of screws 32 (FIG. 11) which partly penetrate into the hard wood frame parts.

Under bottom plate 10, in front of and behind wheel wells 35, are secured storage boxes 36. They consist likewise of aluminum-coated polyurethane-hard foam plates 37, which are joined with each other by means of sectional aluminum strips 6 in the same manner as plates 1, 2, 3 and 4. They are held by angle strips 38 under bottom plate 10. The respective outer wall of boxes 36 is formed by the extended outer wall part 39 of the superstructure.

Another essential advantage of the new construction with alcoves is particularly that this superstructure is self-supporting, due to the compactness of the total construction, and material tensions which appear in the conventional manufacturing methods, particularly at the break between the alcove bottom and the front wall adjoining the driver's cabin and which have led to cracks, cannot appear at all in concentrated form. They are evenly distributed over the entire construction.

Figure 12:
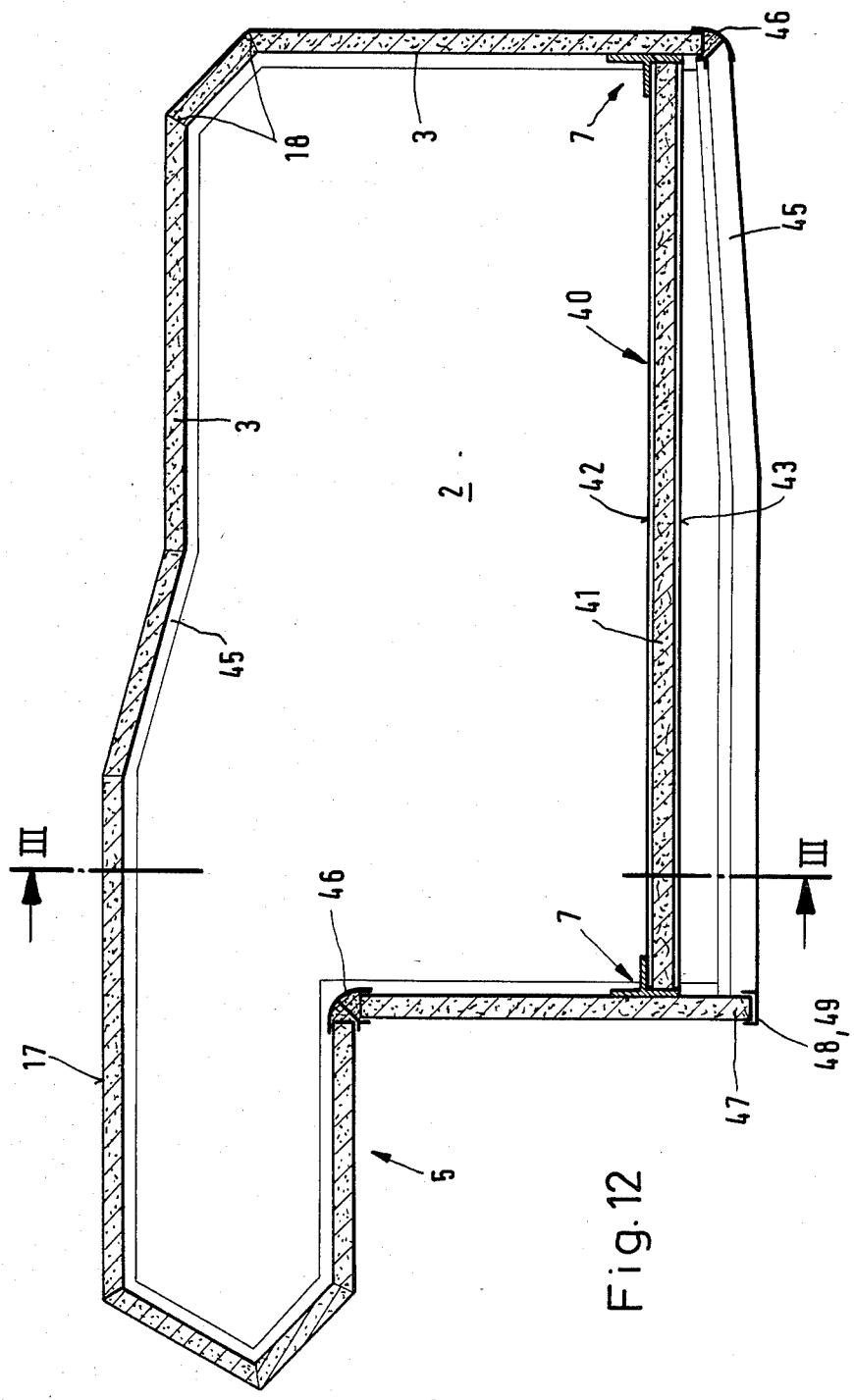
FIG. 12 is a longitudinal section through another embodiment of the superstructure according to the invention with a section through the stiffening transverse sectional aluminum strips and a continuous sandwich plate as a floor.
Figure 13:
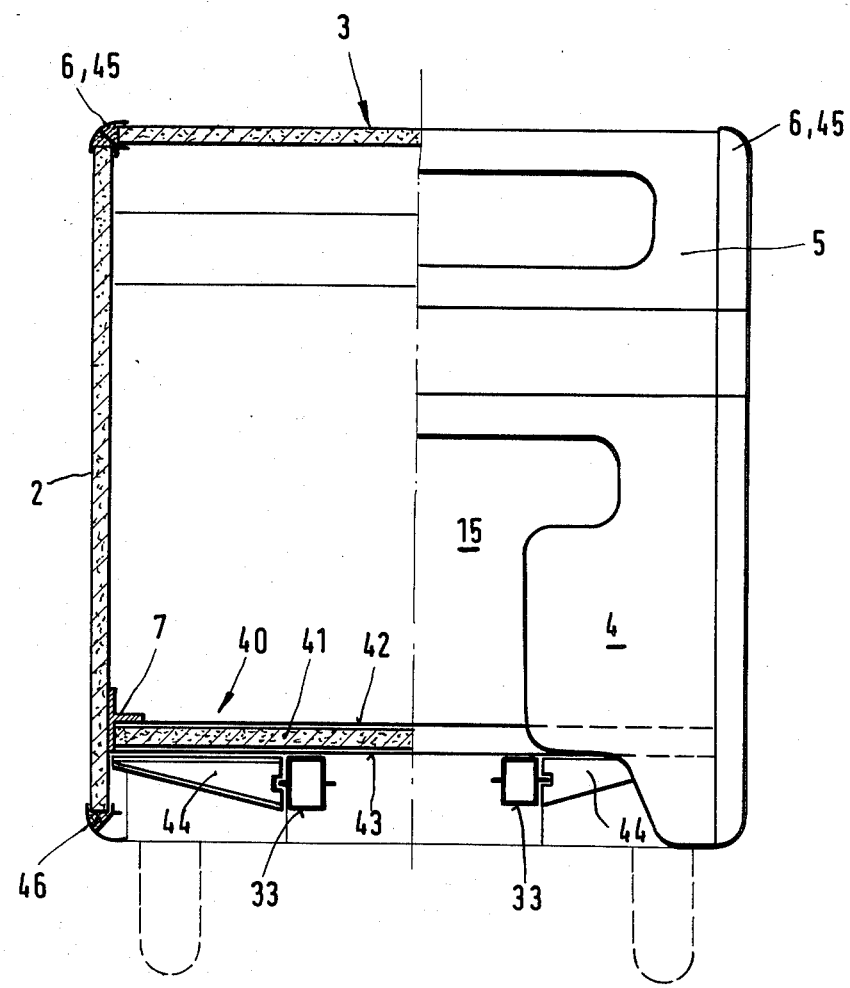
FIG. 13 is a partial cross section through the embodiment of FIG. 12 taken along line III—III of FIG. 12 without storage boxes, with circumferential sectional aluminum strips acting as ring anchors, as well as with a view of the brackets supporting the bottom plate, which are welded to the frame supports of the vehicle.
Figure 14:
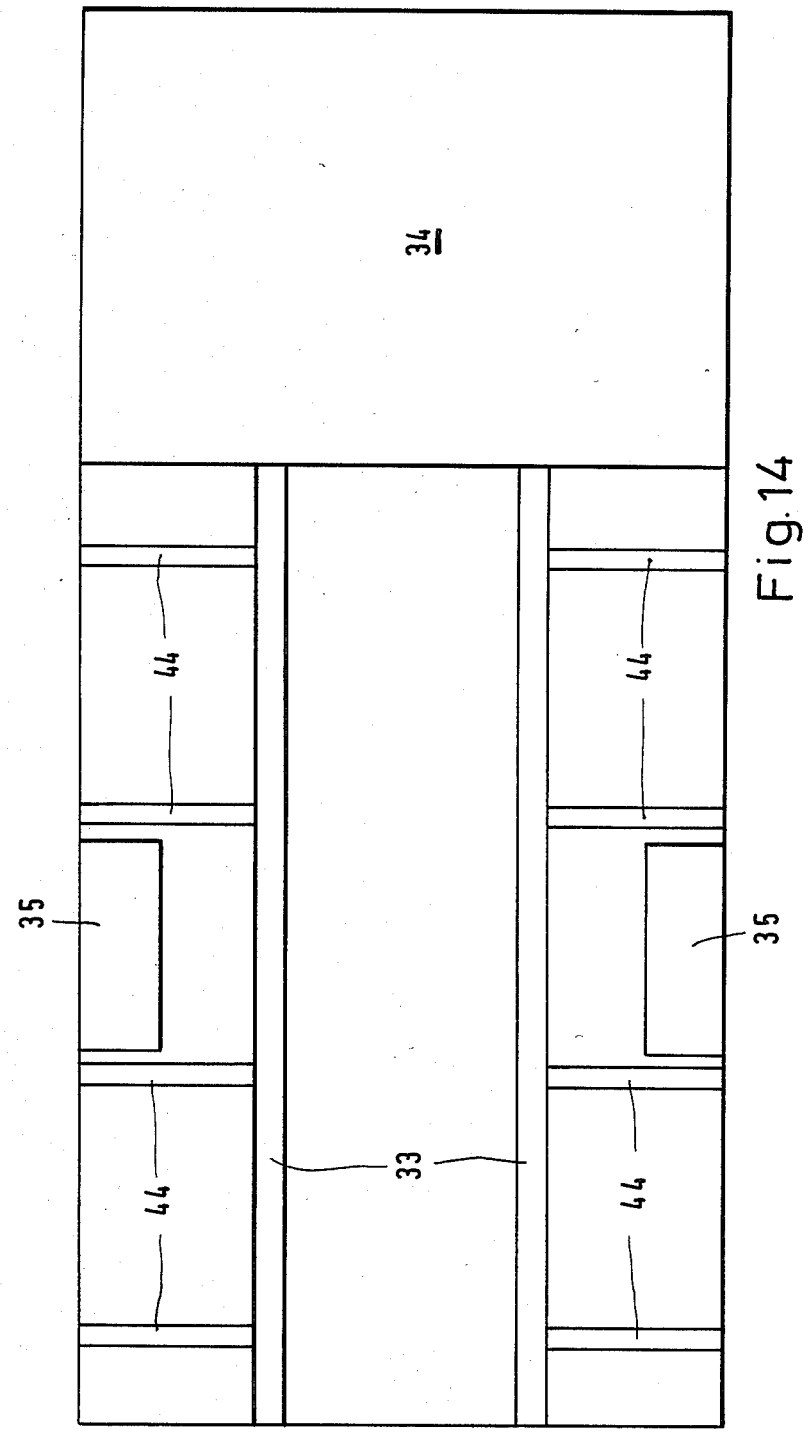
FIG. 14 is a schematic plan view of the superstructure according to the invention as shown in FIGS. 12 and 13, as well as of the vehicle with brackets welded on the frame supports, without storage boxes.

According to another advantageous embodiment of the invention shown in FIGS. 12 and 13, bottom plate 40 is made without an inner frame. It consists of a one-piece plastic hard foam plate 41, which is covered on its top side with a plywood layer 42 and on its underside with a layer of glass fiber-reinforced plastic 43. Bottom plate 40 is secured in the same manner as bottom plate 10.

In order to provide good lateral support from the bottom too, brackets 44 (FIG. 13) are welded on the outside in a right angle on frame members 33 of the vehicle carrying the superstructure according to the invention. This way the superstructure is held not only by frame members 33, but also by brackets 44.

In an advantageous further development of the invention, the aluminum-coated plastic hard foam plates forming the outer walls of the superstructure are bordered on all sides by sectional aluminum strips in order to stabilize the superstructure in such a way that a closed ring anchor 45 is formed. Furthermore, sectional aluminum strips 46 (FIG. 12) extending transverse to ring anchors 45 and joining the latter with each other are welded on the bottom end of the rear wall and in the wall underneath the alcove. Into these transverse sectional aluminum strips are inserted the adjoining plates forming the walls, etc.

Figure 15:
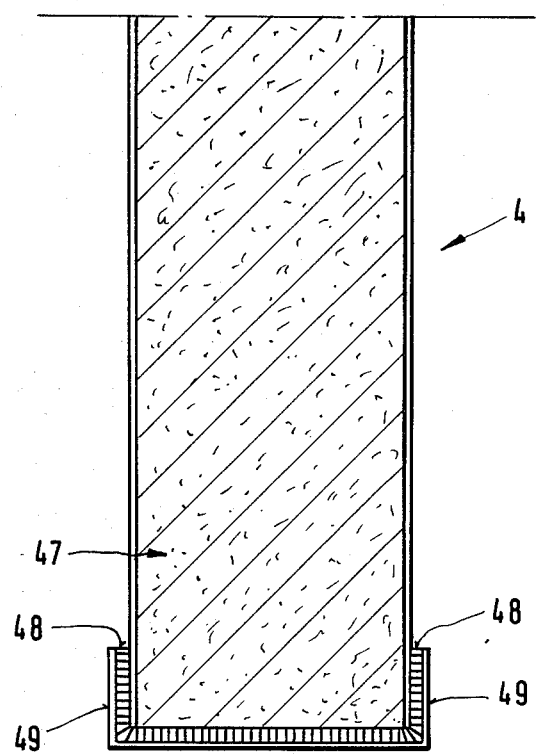
FIG. 15 is a section through a free edge of an aluminum-coated plastic hard foam plate on an enlarged scale with sealing by an aluminum foil coated with a self-adhesive rubber.

In a further advantageous development of the invention shown in FIG. 15, the free cut edges 47 of the aluminum-coated plastic hard foam plates forming the superstructure are sealed by an aluminum foil 49 coated with self-adhesive rubber 48 to prevent exposure of the foam to the elements.

It goes without saying that the embodiments of the superstructure described and illustrated above represent only two advantageous embodiments of the idea of the invention, which do not limit the invention in any way. Thus, the camper superstructure according to the invention can also be designed without an alcove. In this embodiment, the camper superstructure consists of preferably only of three one-piece plastic hard foam plates coated on both sides with aluminum, namely the side walls, as well as the roof with seamless adjoining front and rear walls, which together form a part.

Figure 16:
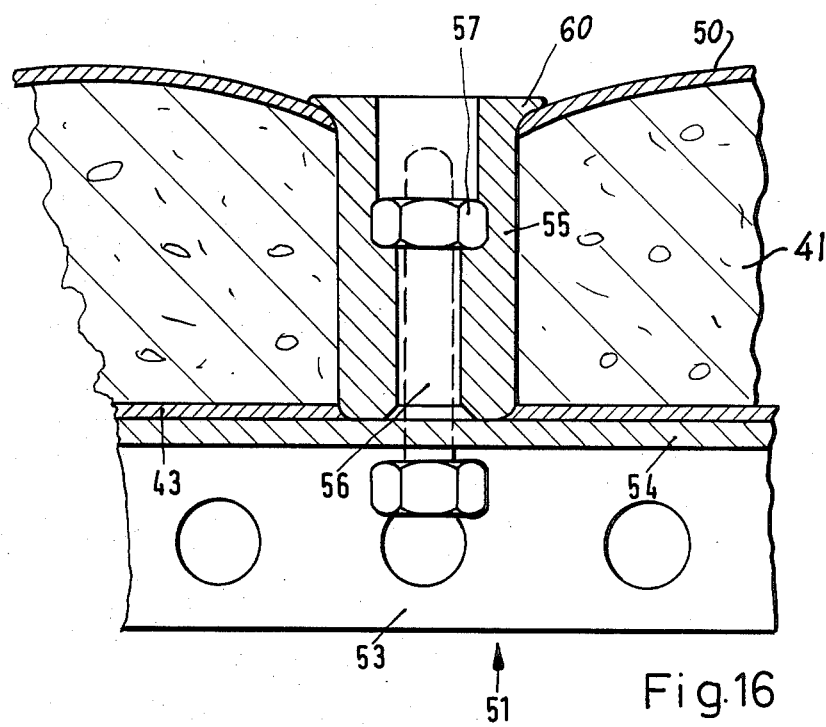
FIG. 16 is a partial sectional view of the bottom plate with the U-section piece secured.
Figure 18:
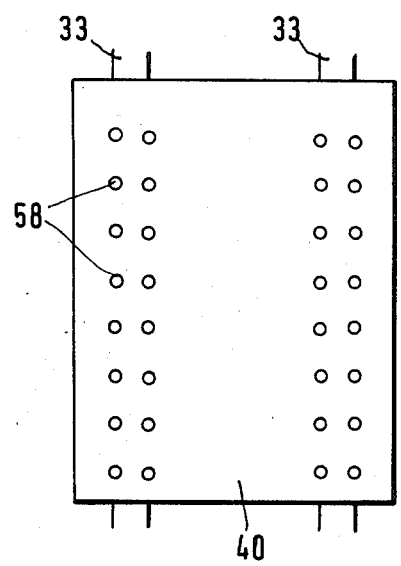
FIG. 18 is a partial top view of the bottom plate.
Figure 17:
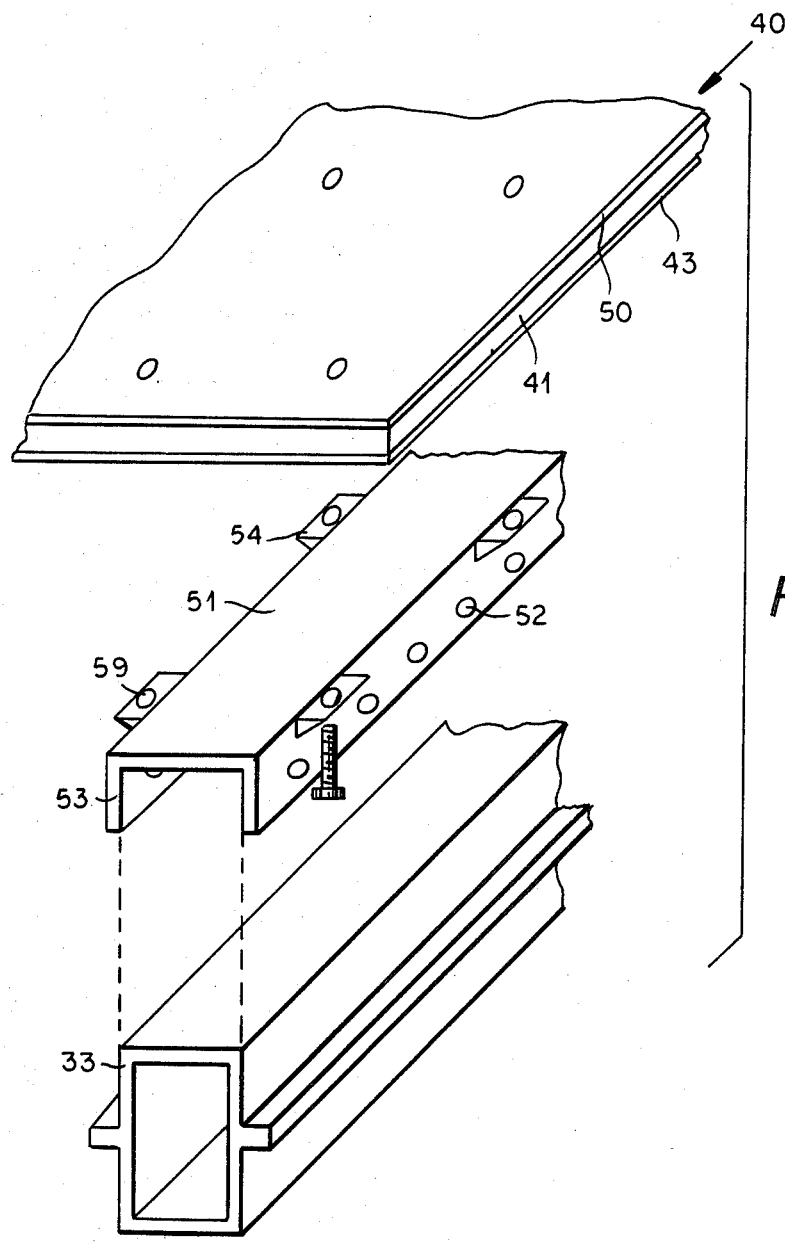
FIG. 17 is a perspective exploded view of the connection bottom plate, U-section piece, chassis.

FIGS. 16, 17 and 18 show a particularly advantageous further development of the bottom plate of the superstructure according to the invention.

According to FIG. 16, bottom plate 40 has a bottom coat 43 of glass-fiber reinforced plastic and a top coat 50 of such glass-fiber reinforced plastic or aluminum.

For joining bottom plate 40 with chassis frame members 33, U-section pieces 51 with perforated arms 53 whose holes 52 permit welding with frame member 33 in the final assembly are used.

U-section pieces 51 are secured on the underside of bottom plate 40 with arms 53 pointing downward, after holes 58 have been drilled by means of drilling jigs in bottom plate 40 (FIG. 18). Into these holes 58, from the top, are inserted retainers 55 in which retaining nuts 57 are non-rotatably secured (FIG. 16). Brackets 54, with screw holes 59, secured, e.g. by welding, laterally on the outside and aligned with the surfaces of the back parts of the U-section pieces 51, permit the introduction from the bottom of screws 56 into retainers 55 and screwing of the same into retaining nuts 57. Collar-shaped edges 60, molded on the upper rim of retainers 55, are pressed into the surface of bottom plate 40, with partial deformation of top coat 50 and hard foam plate 41, until they are aligned, so that the surface of bottom plate 40 remains smooth. Any holes in the upper end of retainers 55 can be closed with rubber or plastic plugs.

Retainers 55 consist of very hard plastic. The wide projecting rim of the latter has the advantage that it permits firm tightening of the fastening screw, and that it pulls the coating of the glass fiber reinforced plastic of the bottom plates somewhat to the inside of its range. This has the effect that the rim of the retainer does not project relative to the other surfaces of bottom plate 40, so that it is not visible on the surfaces after it has been covered with rugs.

The box structure formed by the walls 1, 3, 4, 10 etc. can have supports 65 which are extensible as represented by the arrows 66 for supporting the structure on the ground.

It will be appreciated that while this invention has been described by reference to presently preferred embodiments, it may be otherwise variously practiced within the scope of the appended claims which, alone, define the scope of the invention.

What is claimed is:

1. A camper structure adapted to be mounted on a vehicle chassis and comprising:
   a one-piece element defining a front wall, a top wall angularly adjoining the front wall and a rear wall angularly adjoining said top wall at respective angular junctions, said one-piece element being composed of a hard-foam plate sandwiched between aluminum layers, an outer one of said aluminum layers being bent at each of said junctions, said plate being mitered at each of said junctions to form adjoining edges adhesively bonded together;
   a pair of side walls extending perpendicularly to the front, top and rear walls, said front, top and rear walls being connected to said side walls by connector strips each receiving an edge of said side wall and an edge of a respective one of said front, top and rear walls, said connector strips extending peripherally all around said side walls and adjoining one another at abutting mitered edges at which said connector strips are welded together so that the connector strips around the periphery of each side wall form a closed stabilizing ring, each of said side walls being composed of a hard-foam plate sandwiched between aluminum layers;
   a T-section member lying substantially in a plane perpendicular to said front, rear and side walls and adhesively bonded to inner ones of said aluminum layers of said front, rear and side walls in a circumferentially closed configuration whereby a flange of said member projects inwardly all along said circumferentially closed configuration;
   a floor composed of an insulating foam plate sandwiched between upper and lower layers secured from below to said flange all around said circumferentially closed configuration; and
   reinforcing connecting strips extending along the bottom of said rear wall and across said front wall and welded to said rings whereby said strips, said walls and said floor form a self-supporting box.

2. The camper structure defined in claim 1 wherein said box is provided with extensible supports beneath said floor for supporting said box on the ground.

3. The camper structure defined in claim 1 wherein said box is formed with a forwardly projecting alcove.

4. The camper structure defined in claim 1 wherein each of said connector strips is formed of an aluminum section rounded over a quadrant and forming channels lying at right angles to one another into which said edges are fitted, said channels being separated by a partition lying at an angle of 45° to each of said channels, each of said strips further having stops limiting the insertion of the respective edges into the respective channels whereby, between the edges of the walls inserted into the respective channels and said partitions, cavities are defined which are filled with foamed synthetic material.

5. The camper structure defined in claim 4 wherein said channels are serrated to grip the aluminum layers of the edges of the walls received in said channels.

6. The camper structure defined in claim 1 wherein said box is formed with wheel wells at opposite side walls thereof and with boxlike compartments in front of and behind each of said wheel wells.

7. The camper structure defined in claim 6, further comprising a tank received in at least one of said compartments.

8. The camper structure defined in claim 1 wherein said hard foam plates each have a hard foam layer of a thickness of about 5 cm between aluminum layers of a thickness of about 1 cm each and of chromatized aluminum.

9. The camper structure defined in claim 8 wherein said floor is a further hard foam plate.

10. The camper defined in claim 1 wherein at least one of said front, rear and side walls has a free-cut edge sealed by an aluminum foil covered with self-adhesive rubber.

* * * * *